United States Patent Office 3,471,559
Patented Oct. 7, 1969

1

3,471,559
SUBSTITUTED SULFONYLBENZAMIDES
Robert Allan Scherrer, White Bear Lake, Minn., assignor to Parke, Davis & Company, Detroit, Mich., a corporation of Michigan
No Drawing. Filed Feb. 1, 1967, Ser. No. 613,127
Int. Cl. C07c 143/74; A61k 27/00
U.S. Cl. 260—556    9 Claims

ABSTRACT OF THE DISCLOSURE

N-sulfonylbenzamides (I)

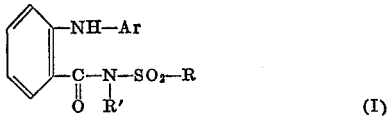

are prepared by reacting a sulfonamide $H_2N-SO_2-R$ with the anhydride or halide of an acid (II) or with isatoic anhydride (III)

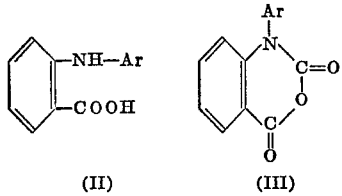

where R is $-NH_2$ or $-CH_3$, R' is H or $-CH_3$, and Ar is o-(2,3-xylyl) or 2,6-dichloro-m-tolyl. The compounds where R' is a methyl group are prepared by N-methylation of the corresponding products where R' is hydrogen. The compounds are pharmacological agents having anti-inflammatory activity.

SUMMARY AND DETAILED DESCRIPTION

This invention relates to novel substituted N-sulfonylbenzamides and to methods for producing the same. More particularly, the invention relates to N-sulfonylbenzamides which can be represented by the formula

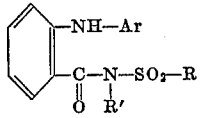

and to methods for producing the same, where R is $-NH_2$ or methyl, R' is hydrogen or methyl, and Ar is o-(2,3-xylyl) or 2,6-dichloro-m-tolyl. Preferred products of the invention are those in which R is $-NH_2$ and R' is hydrogen.

In accordance with the invention, N-sulfonylbenzamides corresponding to the formula where R' is hydrogen can be produced by reacting an isatoic anhydride represented by the formula

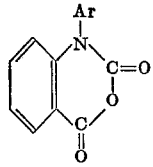

with a sulfonamide represented by the formula $H_2N-SO_2-R$ in the presence of base, where Ar and R have the foregoing significance.

2

The reaction conditions are subject to wide variation and are not critical. It is usually satisfactory to employ substantially equivalent quantities of the anhydride, sulfonamide and base. Preferably, a slight excess of the sulfonamide and the base is employed. The reaction is conveniently carried out at temperatures in the range from 40 to 200° C. for periods from about one-half to 24 hours. Preferably, the reaction is carried out at temperatures in the range from 65 to 125° C. for 1 to 6 hours. A suitable base for the reaction is an alkali metal hydride such as sodium hydride an amide such as sodamide, or an alkoxide such as sodium ethoxide. A preferred base is sodium hydride. Conveniently, the reaction is carried out in an inert organic solvent such as xylene, toluene, N-methyl-2-pyrrolidone, dimethylformamide, dibutyl ether, dioxane, diethylene glycol dimethyl ether, dimethoxyethane and the like. The product can be isolated in pure form by extraction, crystallization or precipitation following acidification of the reaction mixture.

Also in accordance with the invention, N-sulfonylbenzamides represented by the foregoing formula where R' is hydrogen can be prepared by reaction of an anhydride or halide of an anthranilic acid represented by the formula

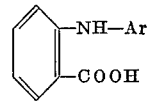

with a sulfonamide represented by the formula:

$H_2N-SO_2-R$ preferably in the presence of tertiary amine, where Ar and R have the foregoing significance. The reaction conditions are subject to wide variation and are not critical. For example, when carrying out the reaction with an acid chloride temperatures in the range from 25–150° C. for periods from 1 to 24 hours may be conveniently used, preferred temperatures being in the range from 75–125° C. for periods from 2 to 6 hours. A solvent for the reaction may be used if desired. Suitable solvents include tertiary amines such as pyridine, tributylamine and the like; ethers such as dioxane, dimethoxyethane, diethylene glycol dimethyl ether and dibutyl ether; hydrocarbons such as toluene and xylene; and tertiary amides such as dimethylformamide, N-methyl-2-pyrrolidone and N,N-dimethylacetamide. It is generally satisfactory to employ substantially equivalent quantities of the reactants. Preferably, a slight excess of the sulmonamide is employed. The product can be isolated in pure form by extraction, crystallization or precipitation.

Further, in accordance with the invention, N-sulfonylbenzamides having the foregoing formula in which R' is a methyl group are produced by reacting an N-sulfonyl benzamide of the same formula where R' is hydrogen, with a methylating agent, preferably in the presence of an inorganic base and a nonreactive solvent. Suitable methylating agents for the reaction are in the general methyl esters of strongly acidic inorganic or organic acids such as methyl iodide, methyl bromide, dimethyl sulfate, methyl p-toluenesulfonate and methyl methanesulfonate. The methylating agent is preferably used in conjunction with an inorganic base such as an alkali metal bicarbonate, carbonate or hydroxide. A preferred combination of methylating agent and inorganic base is methyl iodide and potassium carbonate. The relative proportion of reactants is not critical but in general it is satisfactory to employ substantially equivalent quantities of reactants. Preferably an excess of the methylating agent and of the base, if any, is used. Any of a variety of nonreactant solvents may be used for the reaction. Suitable solvents include hydrocarbons and chlorinated hydrocarbons such as benzene, toluene, carbon tetrachloride and ethylenedichloride; ethers such as diethyl ether, dioxane, tetrahydrofuran and dimethoxyethane; lower alkanones such as acetone and methyl ethyl ketone; tertiary amides such as dimethylformamide and N-methyl-2-pyrrolidone; lower alkanols such as methanol and ethanol. The reaction conditions are not critical and may be varied over a wide range. Conveniently, the reaction mixture is maintained at temperatures in the range from 40 to 60° C. for periods from one-quarter to 2 hours, following which the mixture is allowed to stand for 10–15 hours at room temperature. The product can be isolated in pure form by extraction, crystallization or precipitation.

The compounds of the invention are useful as pharmacological agents. The compounds possess a high degree of anti-inflammatory activity and hence are useful in mitigating the symptoms associated with rheumatic, arthritic and other inflammatory conditions. The compounds are administered orally or parenterally. The oral route is preferred. The compounds can be combined with either a solid or liquid carrier or diluent and made available in varying amounts in such conventional vehicles as tablets, capsules, powders, dragees, suspensions and solutions, or other pharmaceutical forms suitable for oral or parenteral administration. The anti-inflammatory activity of the compounds of the invention can be demonstrated at relatively low dosage of the order of 10 mg./kg. as determined by standard animal (UV-erythema) assay of the type described in Journal of Pharmacology and Experimental Therapeutics, 138, 405, 1962.

The invention is illustrated by the following examples:

EXAMPLE 1

A mixture of sulfamide (7.20 g.) and sodium hydride (2.4 g. of a 50% dispersion in mineral oil) is warmed in 30 ml. of dimethylformamide and 10.0 g. of N-(2,3-xylyl)isatoic anhydride is added. The mixture is heated at 120° C. for 1.5 hours, cooled, diluted with water and acidified with hydrochloric acid. The precipitated oil is separated and dissolved in dilute aqueous sodium hydroxide. The solution is acidified and the product which precipitates is collected. The product is N-sulfamoyl-o-(2,3-xylidino)benzamide; M.P. 150–158° C. For purification, the product is first recrystallized from benzene, then dissolved in aqueous sodium hydroxide with the aid of a small amount of methanol. The solution is filtered through diatomaceous earth and acidified to precipitate N-sulfamoyl-o-(2,3-xylidino)benzamide in purified form; M.P. 187.5–189° C. after recrystallization from ethanol.

By this procedure using the same starting materials except for the replacement of the isatoic anhydride with an equivalent quantity of N-(2,6-dichloro-m-toluidino) isatoic anhydride, the product obtained is o-(2,6-dichloro-m-toluidino)-N-sulfamoylbenzamide.

EXAMPLE 2

16.4 g. of N-(2,3-xylyl)isatoic anhydride is added to a stirred mixture of methanesulfonamide (16.4 g.) and sodium hydride (7.15 g. of a 50% dispersion in mineral oil) in 80 ml. of dimethylformamide, and the mixture is stirred for 5 hours at 70° C. The mixture is cooled, diluted with water and washed with ether. The aqueous solution is acidified to precipitate N-methylsulfonyl-o-(2,3-xylidino)benzamide; M.P. 148–149° C. after recrystallization from ethanol and from toluene.

By this procedure using the same starting materials except for the replacement of the isatoic anhydride by an equivalent quantity of N-(2,6-dichloro-m-toluidino)isatoic anhydride, the product obtained is o-(2,6-dichloro-m-toluidino)-N-methylsulfonylbenzamide.

EXAMPLE 3

A mixture of 10.6 g. of N-(2,6-dichloro-m-tolyl)anthranilic acid chloride and 20 g. of sulfamide is heated at 110° C. for 4 hours with occasional stirring. The mixture is cooled to 50° C., about 25 ml. of methanol is added, and the mixture is heated at reflux with stirring for about 10 minutes. The mixture is cooled, ether and dilute aqueous sodium hydroxide are added with stirring, and the aqueous alkaline phase is separated. The aqueous phase is acidified with hydrochloric acid to precipitate the desired product, o-(2,6-dichloro-m-toluidino)-N-sulfamoylbenzamide; M.P. 189–190° C. after recrystallization from methanol-benzene. The same product is obtained by this procedure substituting for the acid chloride an equivalent amount of the corresponding acid anhydride. Likewise, by this procedure starting with equivalent quantities of methanesulfonamide and the acid chloride or anhydride the product is o-(2,6-dichloro-m-toluidino)-N-methylsulfonylbenzamide. Also by this procedure, starting with methanesulfonamide and N-(2,3-xylyl)anthranilic acid chloride or anhydride, the product is N-methylsulfonyl-o-(2,3-xylidino)benzamide.

The acid chloride starting materials can be prepared by heating the respective acid with thionyl chloride in an excess of petroleum ether solvent at temperatures below 100° C. The corresponding anhydrides are prepared by converting the respective acid to its sodium salt by neutralization with sodium hydroxide and then warming the sodium salt with an equal weight of the acid chloride for one hour at 30° C. in dimethylformamide solution. N-(2,3-xylyl)anthranilic acid anhydride prepared in this way, after recrystallization of the precipitate which separates on cooling, melts at 191–193° C. (from dimethylformamide).

EXAMPLE 4

A mixture of 2.3 g. of N-methylsulfonyl-o-(2,3-xylidino)benzamide, 3.0 ml. of methyl iodide and 0.6 g. of potassium carbonate in 10 ml. of dimethylformamide is stirred and heated at 50° C. for 30 minutes, then allowed to stand at room temperature for 16 hours. The mixture is diluted with water and the solid product, N-methylsulfonyl-N-methyl-o-(2,3-xylidino)benzamide, removed by filtration. For purification, the product is dissolved in a minimum amount of benzene and the solution chromatographed on a column of activated magnesium silicate (Florisil). The column is eluted with benzene and the benzene removed from the eluate by evaporation at reduced pressure. The purified product melts at 100–100.5° C. after recrystallization from benzene-heptane.

By the same procedure starting with an equivalent amount of o-(2,6-dichloro-m-toluidino)-N-methyl sulfonylbenzamide instead of the xylidinobenzamide, the product is o-(2,6-dichloro-m-toluidino)-N-methylsulfonyl-N-methylbenzamide. Similarly, by replacing the amide starting material with N-sulfamoyl-o-(2,3-xylidino)benzamide or o-(2,6 - dichloro - m-toluidino)-N-sulfamoylbenzamide, the product is N-methyl-N-sulfamoyl-o-(2,3-xylidino)benzamide or o-(2,6 - dichloro-m-toluidino)-N-methyl-N-sulfamoylbenzamide, respectively.

I claim:

1. A compound of the formula

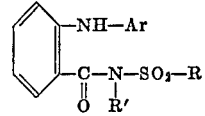

where R is a member of the group consisting of —NH₂ and methyl, R′ is a member of the group consisting of hydrogen and methyl, and Ar is a member of the group consisting of o-(2,3-xylyl) and 2,6-dichloro-m-tolyl.

2. A compound according to claim 1, which compound is N-sulfamoyl-o-(2,3-xylidino)benzamide.

3. A compound according to claim 1, which compound is N-(methylsulfonyl)-o-(2,3-xylidino)benzamide.

4. A compound according to claim 1, which compound is o-(2,6-dichloro - m - toluidino)-N-sulfamoylbenzamide.

5. A compound according to claim 1, which compound is o-(2,6-dichloro - m - toluidino)-N-methylsulfonylbenzamide.

6. A compound according to claim 1, which compound is N-methyl-N-sulfamoyl-o-(2,3-xylidino)benzamide.

7. A compound according to claim 1, which compound is N-methylsulfonyl-N-methyl-o-(2,3-xylidino)benzamide.

8. A compound according to claim 1, which compound is o-(2,6 - dichloro-m-toluidino)-N - methyl-N-sulfamoylbenzamide.

9. A compound according to claim 1, which compound is o-(2,6-dichloro - m - toluidino)-N-methylsulfonyl-N-methylbenzamide.

References Cited

UNITED STATES PATENTS 3,238,201    3/1966   Scherrer _____ 260—244

HENRY R. JILES, Primary Examiner

C. M. SHURKO, Assistant Examiner

U.S. Cl. X.R.

260—999